W. F. BRITTAIN.
COMBINATION LOCK AND JACK.
APPLICATION FILED MAY 5, 1919.

1,334,482.

Patented Mar. 23, 1920.

Inventor
William Franklin Brittain

By Hardaway Carter
Attorneys

UNITED STATES PATENT OFFICE.

WILLIAM FRANKLIN BRITTAIN, OF TROUP, TEXAS, ASSIGNOR OF ONE-HALF TO JACQUES E. BLEVINS, OF HOUSTON, TEXAS.

COMBINATION LOCK AND JACK.

1,334,482.  Specification of Letters Patent.  Patented Mar. 23, 1920.

Application filed May 5, 1919. Serial No. 294,749.

*To all whom it may concern:*

Be it known that I, WILLIAM FRANKLIN BRITTAIN, a citizen of the United States, residing at Troup, in the county of Smith and State of Texas, have invented certain new and useful Improvements in Combination Locks and Jacks, of which the following is a specification.

This invention relates to new and useful improvements in combination lock and jack.

One object of the invention is to provide a device of the character described adapted for use in locking the operating levers of an automobile so as to prevent the theft of the vehicle.

Another object of the invention is to provide a device of the character described, which, when not in use, may be readily detached and collapsed, so that it will not occupy much space, and may be readily stored away.

A further feature of the invention resides in the provision of a device of the character described, which may be also used as a lifting jack.

With the above and other objects in view, the invention has particular relation to certain novel features of construction, operation and arrangement of parts, an example of which is given in this specification and illustrated in the accompanying drawings, wherein.

Figure 1:
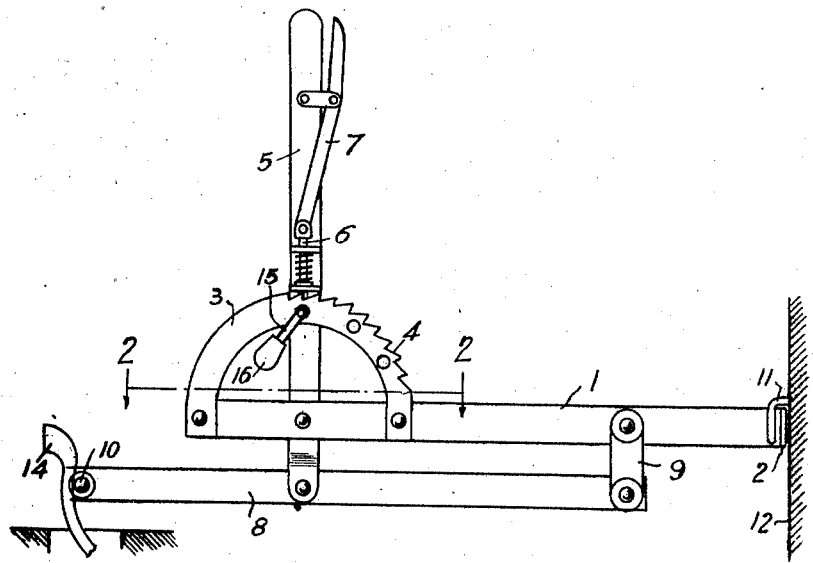
Figure 1, is a side elevation of the device.
Figure 2:
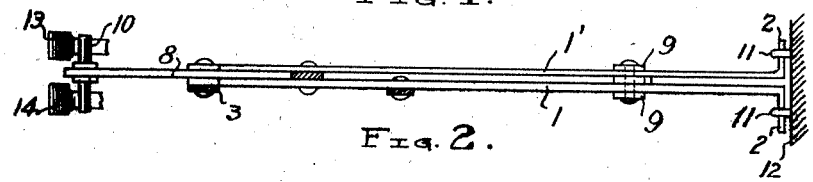
Fig. 2, is a plan view shown partially in section, taken on the line 2—2 of Fig. 1, and Fig. 3, shows the device when applied, as a lifting jack.

Referring now more particularly to the drawings, wherein like numerals of reference designate similar parts in each of the figures, the numerals 1 and 1′, designate the side members of the frame, said members being spaced apart, and at one end, having the outwardly turned portions 2, 2, forming a base and secured to the other end of the side member 1, there is the arcuate rack member 3, formed with the ratchet teeth 4. Pivoted between said side members, there is the manual operating lever 5, provided with the spring seated dog 6, operated in the usual manner by the actuating rod 7. The other end of this lever is extended, and is pivoted to the locking bar 8. One end of this bar is connected to the side members through the links 9, 9, and its other end extends beyond said members and carries the transverse locking rod 10, which extends each way beyond said bar. When it is desired to use the device for locking an automobile, the outwardly turned ends 2, 2, are engaged over the hooks 11, 11, carried by the dash board 12, and spaced apart, and the locking rod 10 is engaged behind the operating levers 13 and 14, of the vehicle. The manual lever 5 is then pulled rearwardly, forcing the locking bar 8 upwardly, and carrying the locking rod 10 against said lever. The dog 6 will engage with the ratchet teeth 4, to hold the device in position, and the hasp 15 of the lock 16 is then passed through alined holes in the rack member 3, and the lever 5, and the lock secured so as to hold said operating levers 13 and 14, against movement.

Figure 3:
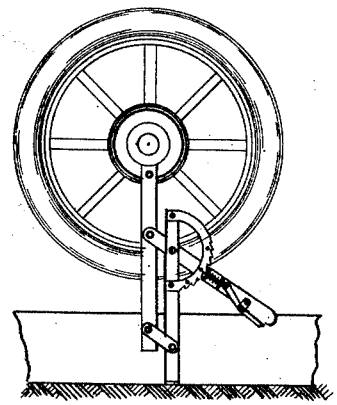

As shown in Fig. 3, the device is applied as a jack. When employed for this position, the base rests upon the ground, and the free end of the bar 8 is inserted under the object to be lifted. The operating lever 5 is then forced downwardly, forcing the bar 8 upwardly, and elevating the object sought to be raised.

When used for this position, the dog 6 will engage with the ratchet teeth 4, to hold the objects sustained by the jack in elevated position.

What I claim is:

A device of the character described, comprising a frame, consisting of side members, spaced apart, said members being turned outwardly at one end forming a base, a rack formed with ratchet teeth, carried by the other end of said frame, a manual lever pivoted to the frame, and provided with a dog adapted to coöperate with said rack, whereby the manual lever may be held in fixed position relative to the frame, a locking bar, a link connecting one end of said bar to said frame, a locking rod carried by the other end of said bar and extending each way therefrom, said bar being pivotally connected to said lever and adapted to be actuated lengthwise relative to the frame, through the manipulation of said lever.

In testimony whereof I have signed my name to this specification in the presence of two subscribing witnesses.

WILLIAM FRANKLIN BRITTAIN.

Witnesses:
 EDDIE HAGLER,
 IDA FERGUSON.